United States Patent [19]

Vincent

[11] 4,429,345

[45] Jan. 31, 1984

[54] ELECTRICAL DEVICES IMPREGNATED WITH SILICONE FLUIDS

[75] Inventor: Gary A. Vincent, Midland, Mich.

[73] Assignee: Dow Corning Corporation, Midland, Mich.

[21] Appl. No.: 322,355

[22] Filed: Nov. 18, 1981

[51] Int. Cl.$^3$ .................. H01G 4/22; H01G 4/04; H05K 5/06

[52] U.S. Cl. .................. 361/315; 252/573; 361/327; 174/17 LF; 174/25 C

[58] Field of Search .................. 252/573; 361/15, 327, 361/315; 336/94; 174/25 C, 17 LF; 556/450, 451, 460

[56] References Cited

U.S. PATENT DOCUMENTS

| | | | |
|---|---|---|---|
| 2,377,689 | 6/1945 | Hyde | 361/327 |
| 2,557,928 | 6/1951 | Atkinson | 361/327 |
| 2,934,549 | 4/1960 | Tarrant et al. | 252/573 |
| 2,951,862 | 9/1960 | Pierce | 252/573 |
| 3,696,137 | 10/1972 | Clark et al. | 252/573 |
| 4,147,646 | 4/1979 | Cappo | 252/573 |
| 4,172,806 | 10/1979 | Vincent | 252/573 |

*Primary Examiner*—Edward C. Kimlin
*Assistant Examiner*—Merrell C. Cashion
*Attorney, Agent, or Firm*—Jack E. Moermond

[57] ABSTRACT

Electrical devices that are impregnated with a dielectric fluid, that is substantially free from water, having a high level of unsaturation and a low viscosity, are disclosed. This dielectric fluid is a reaction product of a siloxane and a silane. The silane has the general formula $R_aR'_b Si(OX)_{4-a-b}$ wherein R is selected from the group consisting of hydrogen, substituted saturated hydrocarbon radicals, and unsubstituted saturated hydrocarbon radicals, R' is selected from the group consisting of substituted and unsubstituted unsaturated hydrocarbon radicals, X is selected from the group consisting of alkyl, alkenyl, alkynyl, aryl and acyl radicals, a has a value of 0 to 3, b has a value of 0 to 3, with a+b having a value of 0 to 3.

31 Claims, No Drawings

ELECTRICAL DEVICES IMPREGNATED WITH SILICONE FLUIDS

BACKGROUND OF THE INVENTION

This invention relates to electrical devices impregnated with a dielectric fluid, that is substantially free from water, having a high unsaturation level and a low viscosity. This dielectric fluid is a reaction product of a siloxane and a silane.

The silane has the general formula of $R_aR'_b Si(OX)_{4-a-b}$ wherein R is selected from the group consisting of hydrogen substituted saturated hydrocarbon radicals, and unsubstituted saturated hydrocarbon radicals, R' is selected from the group consisting of substituted and unsubstituted unsaturated hydrocarbon radicals, X is selected from the group consisting of alkyl, alkenyl, alkynyl, aryl, and acyl radicals, a has a value of 0 to 3, b has a value of 0 to 3, with a+b having a value of 0 to 3.

In numerous electrical devices, such as transformers, cables, capacitors, switches, fuses, reactors, regulators, circuit breakers, and similar equipment, it is necessary to provide a liquid insulating medium which is called a "dielectric fluid". This liquid has a substantially higher breakdown strength than air and by displacing air from spaces between conductors in the electrical apparatus, materially raises the breakdown voltage of the electrical device. With the ever increasing sophistication of electrical equipment, the various electrical devices are operating at higher and higher voltages. This means that the dielectric fluids used in such devices are subjected to greater and greater stresses. These problems have, of course, necessitated the search for improved dielectric fluids.

Over the years a wide variety of fluids have been used as dielectric fluids in various kinds of electrical devices. By way of example one might mention the classes of mineral oils, askarels, vegetable oils, organic esters, polyhydrocarbon oils, fluorinated liquids, and silicone liquids. As one might surmise from the foregoing host of materials which have been used as dielectric fluids, no one fluid is ideal or solves all of the industries needs.

It has been discovered in accordance with this invention that when a dielectric fluid, that is substantially free from water, which is a reaction product of a siloxane and silane, having a high unsaturation level and a low viscosity, is used to impregnate electrical devices, that not only are good physical and electrical properties obtained, but enhanced flammability characteristics can be achieved. The silane has the general formula $R_aR'_b Si(OX)_{4-a-b}$ wherein R is selected from the group consisting of hydrogen, substituted saturated hydrocarbon radicals, and unsubstituted saturated hydrocarbon radicals, R' is selected from the group consisting of substituted and unsubstituted unsaturated hydrocarbon radicals, X is selected from the group consisting of alkyl, alkenyl, alkynyl, aryl, and acyl radicals, a has a value of 0 to 3, b has a value of 0 to 3, with a+b having a value of 0 to 3.

It is thus an object of this invention to provide electrical devices impregnated with said dielectric fluid.

DETAILED DESCRIPTION

This invention relates to electrical devices impregnated with a dielectric fluid, that is substantially free from water, having a high unsaturation level and a low viscosity. This dielectric fluid is a reaction product of a siloxane and a silane. The silane has the general formula of $R_aR'_b Si(OX)_{4-a-b}$ wherein R is selected from the group consisting of hydrogen, substituted saturated hydrocarbon radicals, and unsubstituted saturated hydrocarbon radicals, R' is selected from the group consisting of substituted and unsubstituted unsaturated hydrocarbon radicals, X is selected from the group consisting of alkyl, alkenyl, alkynyl, aryl, and acyl radicals, a has a value of 0 to 3, b has a value of 0 to 3, with a+b having a value of 0 to 3.

More specifically this invention relates to an electrical device impregnated with a dielectric fluid that is substantially free from water, which is a reaction product of a siloxane and a silane, said silane having the general formula $R_aR'_b Si(OX)_{4-a-b}$, wherein X is selected from the group consisting of alkyl, alkenyl, alkynyl, aryl, and acyl radicals, R is selected from the group consisting of hydrogen, substituted saturated hydrocarbon radicals, and unsubstituted saturated hydrocarbon radicals, R' is selected from the group consiting of substituted and unsubstituted unsaturated hydrocarbon radicals, a has a value of 0 to 3, b has a value of 0 to 3, with a+b having a value of 0 to 3, said dielectric fluid having an unsaturation level of greater than ten percent by weight and a viscosity of less than one hundred centistokes at 25° C.

So far as is known at this time any dielectric fluid, that is substantially free from water, having a high level of unsaturation and a low viscosity, which is a reaction product of a siloxane and a silane, said silane having the general formula $R_aR'_b Si(OX)_{4-a-b}$, can be used to impregnate electrical devices of this invention. The most important electrical device in which the dielectric fluid of this invention is useful is in capacitors. They are also useful in other electrical devices such as cables, transformers, fuses, reactors, regulators, circuit breakers, and similar devices. The methods for employing the dielectric fluids in these various applications (for example impregnation) are well know to those skilled in the art.

The silane useful in the present invention has the general formula $R_aR'_b Si(OX)_{4-a-b}$. R' in the general silane formula can be any substituted or unsubstituted unsaturated hydrocarbon radical. The number of carbon atoms in this group is not known to be critical for the purpose of this invention, however it is preferred that it contain from 1 to 18 carbon atoms. Examples of suitable unsaturated hydrocarbon radicals includes alkenyl, cycloalkenyl, alkynyl, aryl, alkaryl, aralkyl, alkenylaryl, alkynylaryl, and corresponding substituted unsaturated hydrocarbon radicals. Specific examples of suitable unsaturated hydrocarbon radicals includes alkenyl radicals such as vinyl, allyl, butylene, hexylene, octylene, or decylene radicals; cycloalkenyl radicals such as cyclopentene or cyclohexene radicals; alkynyl radicals such as acetylene, propyne, butyne, pentyne, or decyne radicals; aryl radicals such as phenyl, 2-napthyl, 2-anthracyl, or biphenylradicals; alkaryl radicals such as 4-methylphenyl, 2,4-diethylphenyl, and 4-dodecylphenyl radicals; aralkyl radicals such as benzyl, beta-phenylethyl, and 3,5 dimethylethylphenylethyl radicals; alkenylaryl radicals such as styrene or allylbenzene radicals; alkynylaryl radicals such as phenylacetylene or diphenylacetylene radicals; and the corresponding substituted unsaturated hydrocarbon radicals such as dichlorophenyl, nitrophenyl, or trifluorovinyl radicals. It is preferred that R' be an unsubstituted unsaturated aromatic hydrocarbon radical. It is most preferred that R' be a phenyl radical.

Hydrogen, substituted saturated hydrocarbon radicals, and unsubstituted saturated hydrocarbon radicals are denoted by the symbol R in the general silane formula. Though there is no real limitation on the number of carbon atoms present in the saturated hydrocarbon radical group, it is preferred that the radical contain from 1 to 18 carbon atoms. Examples of suitable saturated radicals include alkyl, cycloalkyl, and corresponding substituted radicals. Specific examples of suitable saturated radicals are alkyl radicals such as methyl, ethyl, propyl or butyl radicals; cycloalkyl radicals such as cyclohexyl and cyclooctyl radicals; and the corresponding substituted saturated hydrocarbon radicals such as chlorobutyl or nitromethyl radicals.

In the general silane formula, X can be any alkyl, alkenyl, alkynyl, aryl or acyl radical. Though there is no real limit on the number of carbon atoms contained in X, it is preferred that the radical contain from 1 to 18 carbon atoms. Specific examples of suitable radicals are alkyl radicals such as methyl, ethyl, propyl, or butyl radicals; alkenyl radicals such as vinyl, allyl, hexylene, octylene, or decylene radicals; alkynyl radicals such as acetylene, propyne, butyne, or heptyne radicals; acyl radicals such as the acetate radical; and aryl radicals such as phenyl, naphthyl, or biphenyl radicals. It is preferred that X be an alkyl radical. It is most preferred that X be a methyl radical.

The symbol a which denotes the number of hydrogens or saturated hydrocarbon radicals in the general silane formula can have a value of 0 to 3. The most preferred value, however, is 0.

The symbol b which defines the number of unsaturated hydrocarbon radicals in the general silane formula can have a value of 0 to 3. It is most preferred that b have a value of 1.

It is also necessary that the sum of a and b in the general silane formula have a value of 0 to 3. It is most preferred that this value be 1.

So far as is known at this time, any siloxane can be used in the present invention. Linear siloxanes, cyclic siloxanes, and mixtures thereof are appropriate examples of siloxanes useful in the invention.

The liquid polyorganosiloxanes useful in this invention are generally composed predominantly of siloxane units of the formula $A_2SiO$ and may also contain small amounts of siloxane units of the formulae $A'_y A_z SiO$ wherein y has a value of 0 to 2, z has a value of 0 to 2, and y+z has a value of 2, $A'_y A_z SiO_{\frac{1}{2}}$, wherein y has a value of 0 to 3, z has a value of 0 to 3, and y+z has a value of 3, $A'_y A_z SiO_{3/2}$, wherein y has a value of 0 to 1, z has a value of 0 to 1, and y+z has a value of 1, and $SiO_2$. Liquid polyorganosiloxanes of the general formula $A'_p A_r SiO(A'_y A_z SiO)_g Si A'_p A_r$, wherein p has a value of 0 to 3, r has a value of 0 to 3, with p+r having a value of 3, and g has a value of 3 to 100, are of interest. However, it is preferred that the siloxane have the general cyclic formula $(A'_y A_z SiO)_q$ wherein q has a value of 3 to 12, with 3 to 8 being preferred. In the foregoing formulae, A' can be any substituted or unsubstituted unsaturated hydrocarbon radical. The number of carbon atoms in this group is not known to be critical for the purpose of this invention, however it is preferred that it contain from 1 to 18 carbon atoms. Examples of suitable unsaturated hydrocarbon radicals includes alkenyl, cycloalkenyl, alkynyl, aryl, alkaryl, aralkyl, alkenylaryl, alkynylaryl, and corresponding substituted unsaturated hydrocarbon radicals. Specific examples of suitable unsaturated hydrocarbon radiclas includes alkenyl radicals such as vinyl, allyl, butylene, hexylene, octylene, or decylene radicals; cycloalkenyl radicals such as cyclopentene or cyclohexene radicals; alkynyl radicals such as acetylene, propyne, butyne, pentyne, or decyne radicals; aryl radicals such as phenyl, 2-naphthyl, 2-anthracyl, or biphenyl radicals; alkaryl radicals such as benzyl, beta-phenylethyl, and 3,5 dimethylethylphenylethyl radicals; alkenylaryl radicals such as styrene or allylbenzene radicals; alkynylaryl radicals such as phenylacetylene or diphenylacetylene radicals; and the corresponding substituted unsaturated hydrocarbon radicals such as dichlorophenyl, nitrophenyl, or trifluorovinyl radicals.

Hydrogen, substituted saturated hydrocarbon radicals, and unsubstituted saturated hydrocarbon radicals are denoted by the symbol A in the general siloxane formulae. Though there is no real limitation on the number of carbon atoms present in the group, it is preferred that the radical contain from 1 to 18 carbon atoms. Examples of suitable saturated radicals include alkyl, cycloalkyl, and corresponding substituted radicals. Specific examples of suitable saturated radicals are alkyl radicals such as methyl, ethyl, propyl, or butyl radicals; cycloalkyl radicals such as cyclohexyl and cyclooctyl radicals; and the corresponding substituted saturated hydrocarbon radicals such as chlorobutyl or nitromethyl radicals. It is preferred that A be an alkyl radical in the general cyclic siloxane formula. It is most preferred that A be a methyl radical in the general cyclic siloxane formula.

In the above formulae, y denotes the number of substituted or unsubstituted unsaturated hydrocarbon radicals. It can have a value of 0 to 2 in the preferred cyclic siloxane, with a preferred value of 0.

The symbol z, in the above siloxane formulae, defines the number of hydrogens, substituted saturated hydrocarbon radicals, or unsubstituted saturated hydrocarbon radicals. In the preferred cyclic siloxane, it can have a value of 0 to 2, with the value of 2 being preferred.

In the preferred cyclic siloxane, the sum of y and z, which denotes the degree of substitution, must have an average value of 2.

The most preferred dielectric fluid at this time is a reaction product of a dimethylcyclosiloxane and a phenyltrimethoxysilane.

The dielectric fluid compositions of this invention may also contain small amounts of conventional additives such as acid scavengers, corrosion inhibitors, and other conventional additives normally employed in such compositions so long as they do not have an adverse effect on the performance of the compositions of this invention.

The siloxanes and silanes useful in the present invention can be prepared by techniques well known to those skilled in the art.

The dielectric fluid, which is a reaction product of a siloxane and a silane, said silane having the general formula $R_a R'_b Si(OX)_{4-a-b}$, can be prepared by equilibrating the silane, by passing a solution of the silane and siloxane through a column heated to 50° C. and packed with a sulfonated polymer of divinylbenzene and styrene, under a vacuum of about 1.0 mm mercury. Trialkoxysilanes and siloxanes can also be equilibrated at 150° C. via a potassium silanolate catalyzed process.

The unsaturation level of the dielectric fluid, which is a reaction product of a siloxane and a silane, said silane having the general formula $R_aR'_b Si(OX)_{4-a-b}$, employed herein, must be greater than ten percent by weight. This level of unsaturation is believed to be essential due to the fact that low levels of unsaturation give poor corona performance due to limited gas absorbing capacity. It should be noted, however, that as the unsaturation level increases, so does the viscosity. The preferred level of unsaturation has a range of 20 to 45 percent by weight.

The viscosity of the dielectric fluid, which is a reaction product of a siloxane and a silane having the general formula $R_aR'_b Si(OX)_{4-a-b}$, must be less than 100 centistokes at 25° C. for use in the electrical devices. This viscosity level is believed to be essential in order that proper impregnation of the electrical device can be achieved within a reasonable time. The preferred viscosity of the dielectric fluid should be less than 45 centistokes.

It is further essential to this invention that the fire point of the said dielectric fluid be greater than 300° C. This is believed to be essential in order to be considered a "safety" liguid.

Furthermore, the dielectric fluid should be substantially free from water since the fluid still has hydrolyzable groups present.

Now in order that those skilled in the art may better understand how the present invention can be practiced, the following examples are given by way of illustration and not by way of limitation. All parts and percents are by weight and all viscosities measured at 25° C. unless otherwise specified. Also, in the examples which follow, the dielectric constants and dissipation factors were measured according to ASTM Test D924; and the flash and fire points were measured according to ASTM Test C92, Cleveland Open Cup.

In the following examples corona inception and corona extinction voltages are reported. During use when a dielectric fluid is placed under increasing stress a point is reached where partial breakdown occurs. The voltage at which the capacitor will suddenly flash into partial discharge or corona is known in the art as the corona inception voltage. The corona will extinguish with a reduction of voltage. The corona extinction voltage is not a fixed value for each fluid but is a function of the intensity and duration of corona before the voltage is reduced. For best results both the corona inception and corona extinction voltage should be as high and as close together as possible. The corona inception and corona extinction voltages reported in the examples were determined using small model capacitors having a 0.01 µf rating.

The test capacitor bodies were procured from Bycap Incorporated, 2554 Lawrence Avenue, Chicago, Illinois 60625. Both film/film and film/paper/film construction capacitors were used in the test program. The film/film capacitors (Part No. 11A 302-103A) contain two 0.0005 inch thick polypropylene films while the film/paper/film capacitors (Part No. 11B 302-103A) contain two 0.0005 inch thick polypropylene films and one 0.0004 inch thick kraft paper layer. The capacitors are made using tab type construction and have very wide margins to preclude flashover at the high test voltages. The corona performance of the two kinds of capacitors is nearly identical.

Number 18 copper wire leads are attached to the capacitor tabs using Stakon Butt Splices No. 2B14. One of each type of capacitor are placed together in a standard one ounce vial. Glass tubing sleeves are used to insulate the leads.

The capacitors are vacuum dried in a standard two liter reaction kettle. Wire racks were constructed to hold one to three vials in each kettle. Vacuum is provided by a mercury diffusion pump and a mechanical force pump. The vacuum system is capable of producing a 10 micron vacuum in the kettle. Test fluids are placed in 125 ml pressure equalizing dropping funnels above the vials. Vacuum is maintained for four days at room temperature prior to impregnating the capacitors. Industry practice is to heat the capacitors during the vacuum drying period. However, with the small test capacitors and the open configuration of the vials it was not found to be necessary. Four days of vacuum corresponds to industry practice and is necessary to insure complete degassing of the polypropylene film.

After the fluid is dropped, the capacitors are allowed to soak for 24 hours prior to testing. Viscous fluids (above approximately twenty centistokes) sometimes require heat during the soaking period to insure complete impregnation. If heat is required, then 85° C. at atmoshperic pressure for 24 hours has been found to be sufficient.

Capacitors were tested for corona using a Biddle Corona Detector (Cat. No. 665609-1). This detector is capable of detecting a 2 pico coulomb discharge occurring over six micro seconds using the 0.01 µf test capacitors. The capacitors are conditioned for a minimum of ten minutes before testing by being energized with 1200 volts alternating current. It is felt this conditioning helps eliminate "noise" by somehow reducing gas voids and/or other foreign bodies within the system. The voltage is then raised on the test capacitors at the rate of 200 to 300 volts/second until the corona inception voltage (CIV) is reached. When the corona inception voltage is reached there will be a sudden, almost instantaneous, increase in corona display on the detector cathode ray tube. The intensity of this "gassing" corona will increase with time if the voltage remains constant, or increase rapidly if the voltage is raised above the corona inception voltage. Corona extinction voltage (CEV) is measured by reducing the voltage rapidly to an arbitrary value and observing the trend of corona intensity. If the corona decreases steadily and extinguishes, then the procedure is repeated with a higher arbitrary voltage selected. The highest arbitrary value that can be selected where the corona will extinguish is the corona extinction voltage. This voltage is not a constant. The CEV will be lower if the corona is allowed to become more intense before voltage reduction. If the voltage is reduced rapidly while the corona is still light, then very high corona extinction voltages may be observed. The value of the difference between the extinction voltages observed with light and heavy corona is greater with high viscosity fluids than with low viscosity fluids.

The apparatus used to prepare the dielectric fluid in the following examples consisted of a half inch by twenty foot Tygon® tube packed with Amberlyst® 15, a sulfonated copolymer of divinylbenzene and styrene sold by Rohm and Hass. One end of the tube was sealed (silicone sealant) in one neck of a 2 liter, 3 necked starting flask. The tube extended to the bottom of the flask. The second joint was fitted with a drying tube, and the third joint was sealed with a glass stopper. The other end of the tube ran into one neck of a 5 liter, 3 necked flask and out another. The 5 liter, 3 necked flask was half filled with silicone oil to serve as a heat exchange medium. The oil was heated to, and maintained at, 55° C. The tube was sealed in one neck of a 2 liter, 3 necked receiving flask equipped with a glass drain on the bottom. The second joint was fitted with a vacuum tube which was attached to a vacuum pump through a dry ice trap. The vacuum pressure was held at about 1.0 mm mercury. The third joint was fitted with a glass stopper.

EXAMPLE 1

A mixture of 64.3 percent of phenyltrimethoxysilane and 35.7 percent of dimethylcyclosiloxane was placed in the 2 liter, 3 necked starting flask. The vacuum pump was turned on and the fluid flowed through the tube to the receiver flask. When all of the fluid had passed through the tube, the fluid was discarded and the dry ice trap was cleaned out. Another solution of the same reactants was placed in the starting flask. When the reactants had been forced through the tube, the volatiles were removed from the dry ice trap and weighed. The rest of the fluid was passed through the tube again, the volatiles collected and weighed, and the process was repeated again and again. The results were:

| Pass | Weight of Volatiles |
|---|---|
| 1 | 41 grams |
| 2 | 39 grams |
| 3 | 27 grams |
| 4 | 19 grams |
| 5 | 27 grams |
| 6 | 20 grams |
| 7 | 15 grams |
| 8 | 12 grams |

The tube was then flushed with hexane. The product was freed of solvent and volatile components by stripping to 250° C. at less than 1.0 mm mercury. The fluid was stripped in the presence of calcium oxide to assure that no rearranging acid was present. 57.9 percent of the fluid was not volatilized and its viscosity was 38 centistokes. The flash and fire points were 268±10° C. and 302±10° C., respectively. This fluid was found to have a dielectric constant of 3.796 at 100 Hertz and a dissipation factor of 0.002474 at 100 Hertz. By nuclear magnetic resonance, the mole ratios of $CH_3Si/CH_3OSi/C_6H_5Si$ were 1.0/0.74/0.53, which corresponds to 39.1 percent of $C_6H_5Si$. The fluid was shaken for 1½ hours with three percent by weight of Fuller's Earth (the generic name for a soft, opaque clay containing silica, alumina, magnesia, and iron oxide), and then vacuum filtered. The fluid was then used to impregnate test capacitors for evaluation and the results are as follows:

| Film/Paper/Film CIV/CEV in volts/mil | Film/Film CIV/CEV in volts/mil |
|---|---|
| 2300/1500 | 2400/1800 |

EXAMPLE 2

A mixture of 47.1 percent of phenyltrimethoxysilane and 52.9 percent of dimethylcyclosiloxane was placed in the starting flask and passed through the tube four times under vacuum. When the product was stripped to 250° C. at less than 1.0 mm mercury, 74 percent of it was not volatilized. This fluid had a viscosity of 70.5 centistokes at about 23° C. Its dielectric constant was found to be 3.452 at 100 Hertz and its dissipation factor was 0.000384 at 100 Hertz. By nuclear magnetic resonance, the product had mole ratios of $CH_3Si/CH_3OSi/C_6H_5Si$ of 1.0/0.28/0.24, which corresponds to 29.7 percent $C_6H_5Si$. The fluid was cleaned with Fuller's Earth by shaking it with 3 percent by weight of the clay for 1½ hours followed by vacuum filtration. The performance in test capacitors is as follows:

| Film/Paper/Film CIV/CEV in volts/mil | Film/Film CIV/CEV in volts/mil |
|---|---|
| 2200/1200 | 1900/1400 |

That which is claimed is:

1. An electrical device impregnated with a dielectric fluid that is substantially free from water which is a reaction product of a cyclic siloxane having the general formula $(A'_yA_zSiO)_q$ wherein,
    A' is selected from the group consisting of substituted and unsubstituted unsaturated hydrocarbon radicals,
    A is selected from the group consisting of hydrogen, substituted saturated hydrocarbon radicals, and unsubstituted saturated hydrocarbon radicals,
    y has a value of 0 to 2,
    z has a value of 0 to 2, with y+z, the degree of substitution, having an average value of 2, and q has a value of 3 to 12 and a silane,
    said silane having the general formula $R_aR'_b Si(OX)_{4-a-b}$, wherein,
    R is selected from the group consisting of hydrogen, substituted saturated hydrocarbon radicals, and unsubstituted saturated hydrocarbon radicals,
    R' is selected from the group consisting of substituted and unsubstituted unsaturated hydrocarbon radicals,
    X is selected from the group consisting of alkyl, alkenyl, alkynyl, aryl, and acyl radicals,
    a has a value of 0 to 3,
    b has a value of 0 to 3, with a+b having a value of 0 to 3,
    said dielectric fluid having an unsaturation level of greater than ten percent by weight and a viscosity of less than one hundred centistokes at 25° C.
2. An electrical device as defined in claim 1 wherein the dielectric fluid has an unsaturation level of 20 to 45 percent by weight and a viscosity of less than 45 centistokes at 25° C.
3. An electrical device as defined in claim 2 wherein the dielectric fluid has a minimum fire point of 300° C.
4. An electrical device as defined in calim 1 wherein X is an alkyl radical, R' is an unsubstituted unsaturated aromatic hydrocarbon radical, and A is an unsubstituted saturated hydrocarbon radical.
5. An electrical device as defined in claim 4 wherein the dielectric fluid has an unsaturation level of 20 to 45 percent by weight, and a viscosity of less than 45 centistokes at 25° C.
6. An electrical device as defined in claim 5 wherein the dielectric fluid has a minimum fire point of 300° C.
7. An electrical device as defined in claim 4 wherein X is a methyl radical, R' is a phenyl radical, A is a methyl radical, b is 1, as is 0, y is 0, and z is 2.
8. An electrical device as defined in claim 7 wherein the dielectric fluid has an unsaturation level of 20 to 45 percent by weight and a viscosity of less than 45 centistokes at 25° C.
9. An electrical device as defined in claim 8 wherein the dielectric fluid has a minimum fire point of 300° C.

10. An electrical device as defined in claim 1 wherein X is an alkyl radical, R' is an unsubstituted unsaturated aliphatic hydrocarbon radical, and A is an unsubstituted saturated hydrocarbon radical.

11. An electrical device as defined in claim 10 wherein the dielectric fluid has an unsaturation level of 20 to 45 percent by weight and a viscosity of less than 45 centistokes at 25° C.

12. An electrical device as defined in claim 11 wherein the dielectric fluid has a minimum fire point of 300° C.

13. An electrical device as defined in claim 10 wherein X is a methyl radical, R' is a vinyl radical, A is a methyl radical, b is 1, a is 0, y is 0, and z is 2.

14. An electrical device as defined in claim 13 wherein the dielectric fluid has an unsaturation level of 20 to 45 percent by weight and a viscosity of less than 45 centistokes at 25° C.

15. An electrical device as defined in claim 14 wherein the dielectric fluid has a minimum fire point of 300° C.

16. An electrical device as defined in claim 1 wherein q has a value of 3 to 8.

17. An electrical device as defined in claim 16 wherein the dielectric fluid has an unsaturation level of 20 to 45 percent by weight and a viscosity of less than 45 centistokes at 25° C.

18. An electrical device as defined in claim 17 wherein the dielectric fluid has a minimum fire point of 300° C.

19. An electrical device as defined in claim 16 wherein X is an alkyl radical, R' is an unsubstituted unsaturated aromatic hydrocarbon radical, and A is an unsubstituted saturated hydrocarbon radical.

20. An electrical device as defined in claim 19 wherein the dielectric fluid has an unsaturation level of 20 to 45 percent by weight and a viscosity of less than 45 centistokes at 25° C.

21. An electrical device as defined in claim 20 wherein the dielectric fluid has a minimum fire point of 300° C.

22. An electrical device as defined in claim 19 wherein X is a methyl radical, R' is a phenyl radical, A is a methyl radical, b is 1, a is 0, y is 0, and z is 2.

23. An electrical device as defined in claim 22 wherein the dielectric fluid has an unsaturation level of 20 to 45 percent by weight and a viscosity of less than 45 centistokes at 25° C.

24. An electrical device as defined in claim 23 wherein the dielectric fluid has a minimum fire point of 300° C.

25. An electrical device as defined in claim 16 wherein X is an alkyl radical, R' is an unsubstituted unsaturated aliphatic hydrocarbon radical, and A is an unsubstituted saturated hydrocarbon radical.

26. An electrical device as defined in claim 25 wherein the dielectric fluid has an unsaturation level of 20 to 45 percent by weight and a viscosity of less than 45 centistokes at 25° C.

27. An electrical device as defined in claim 26 wherein the dielectric fluid has a minimum fire point of 300° C.

28. An electrical device as defined in claim 25 wherein X is a methyl radical, R' is a vinyl radical, A is a methyl radical, b is 1, a is 0, y is 0, and z is 2.

29. An electrical device as defined in claim 28 wherein the dielectric fluid has an unsaturation level of 20 to 45 percent by weight and a viscosity of less than 45 centistokes at 25° C.

30. An electrical device as defined in claim 29 wherein the dielectric fluid has a minimum fire point of 300° C.

31. An electrical device as defined in claims 1 to 30 wherein said electrical device is a capacitor.

* * * * *